United States Patent [19]

Bingham

[11] Patent Number: 4,840,057

[45] Date of Patent: Jun. 20, 1989

[54] METHOD AND APPARATUS FOR TESTING RELIEF VALVE

[76] Inventor: George H. Bingham, P.O. Box 10706, Bakersfield, Calif. 93309

[21] Appl. No.: 157,593

[22] Filed: Feb. 19, 1988

[51] Int. Cl.⁴ .......................................... G01M 19/00
[52] U.S. Cl. ........................................ 73/4 R; 73/168
[58] Field of Search ................... 73/4 R, 168, 865.9

[56] References Cited

U.S. PATENT DOCUMENTS

| | | |
|---|---|---|
| 2,178,901 | 11/1939 | Webster . |
| 2,952,151 | 9/1960 | Simonson et al. ............... 73/4 R |
| 3,269,170 | 8/1966 | Sebring et al. ................. 73/4 R |
| 3,768,299 | 10/1973 | Garren ............................ 73/4 R |
| 3,872,875 | 3/1975 | Raidl, Jr. ..................... 73/4 R X |
| 4,428,223 | 1/1984 | Trevisan ......................... 73/4 R |
| 4,480,653 | 11/1984 | Vonderburg ................... 73/4 R X |
| 4,548,067 | 10/1985 | Cox ................................ 73/4 R |
| 4,550,780 | 11/1985 | Mott ........................... 166/321 X |
| 4,618,000 | 10/1986 | Burris, II ..................... 166/319 X |
| 4,624,315 | 11/1986 | Dickson et al. ................. 166/323 |
| 4,761,999 | 8/1988 | Thompson ....................... 73/168 |
| 4,766,765 | 8/1988 | Ezekoye ......................... 73/168 |

*Primary Examiner*—Tom Noland
*Attorney, Agent, or Firm*—Dodge, Bush & Moseley

[57] ABSTRACT

Method and apparatus for mounting and testing pressure relief safety valves while maintaining an operational capability of the safety valve and that minimizes malfunctioning and tampering with the associated fluid isolation ball-type block valves. The fluid isolation block valve is preferably manually actuated from the exterior of the apparatus to assure positive controlled operation. A releasable external locking arrangement is provided to maintain the isolation block valve in the open position and prevent undesired isolation of the safety valve from the working fluid during normal operations.

5 Claims, 1 Drawing Sheet

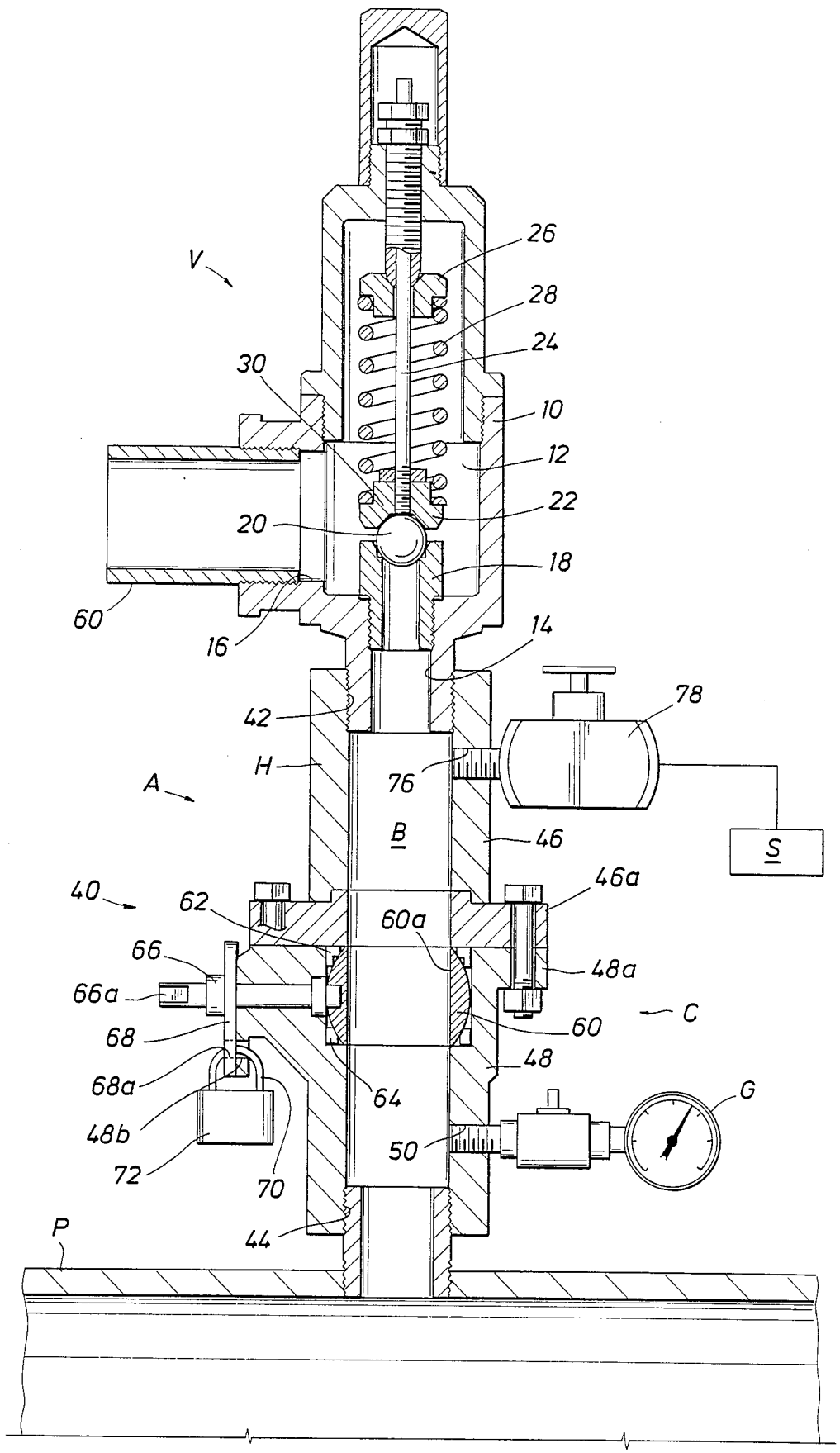

METHOD AND APPARATUS FOR TESTING RELIEF VALVE

BACKGROUND OF THE INVENTION

The use of pressure safety relief valves to protect flow control equipment from damage by unanticipated pressure increases or surges is both well known and accepted common practice. In fact, almost all safety codes require some minimum use of pressure relief valves although the descriptive nomenclature for the pressure relief safety devices employed may vary. Such devices are commonly called "pop" valves, safety valves or relief valves in the art.

Basically, a pressure relief safety valve employs a movable flow closure element that seals with a seat ring fixedly carried by a valve housing. An adjustable spring or other biasing means is typically employed to hold the closure member in sealing engagement with the seat ring. The spring is selected and adjusted to maintain the seal at normal or anticipated fluid pressure operating conditions, but enables the safety valve to open at a higher predetermined or preselected pressure. The predetermined abnormally high valve opening fluid pressure increases the force urging on the spring to compress the spring and separate the closure element from the seat ring to vent the overpressure condition. When the contained pressure drops or returns to the normal operating range, the spring returns the closure element back into sealing engagement with the seat ring in order that normal flow operations and safety protection may be resumed.

To prevent this safety protection against catastrophic failure of the flow control equipment from being intentionally or accidentally disabled, many safety codes normally prohibit the installation of a block valve for isolating the safety relief valves from the operating fluid pressure. This is not entirely satisfactory as the relief valve can only be tested or repaired if malfunctioning only by shutting down and emptying the entire flow system. In some flow applications this may be a massive undertaking that can be accomplished only at great expense.

To overcome this problem, devices and procedures for on-stream or in place testing of safety valves have been developed. In U.S. Pat. No. 4,548,067 to Cox, entitled "Method and Apparatus for Testing a Relief Valve" such an onstream test device and method is disclosed. The Cox device includes a tubular body or housing having an internal bore or flow passage which is placed in internal fluid communication with the operating fluid pressure source or equipment. The relief valve is secured to the housing so that the operating fluid is internally communicated by the housing to the safety valve. Also disposed in the housing bore is an automatic check valve which enables essentially unrestricted flow from the source to the relief valve but prevents or blocks flow from the housing back toward the source. Between the check valve and the safety valve a valved side port is located. Test fluid under pressure is injected into the housing bore through the side port to close the check valve and isolate the test fluid from the operating pressure. The test fluid is communicated to the safety valve for verifying proper operation of the safety valve. By monitoring the pressure of the test fluid at which the safety valve opens the set or opening pressure of the safety valve may be verified. As soon as verification of the opening pressure is completed, the test pressure is vented for automatically restoring the overpressure protection of the safety relief valve. While the disclosed system is a valuable improvement over the prior art, proper operation of the visually concealed internal check valve is not certain. Should the check valve malfunction, the system may be rendered inoperable or worse still, the overpressure protection may be rendered inoperable.

In Webster U.S. Pat. No. 2,178,901 a similar test check valve arrangement is disclosed, but the check valve is located in the safety valve inlet. See also U.S. Pat. No. 3,768,299 to Garren for a test housing which employs a swing-type check valve.

Simonson et al U.S. Pat. No. 2,952,151 discloses as specialized external tester for an internal safety valve. Such internal safety valves do not lend themselves to onstream or in service testing.

Sebring et al U.S. Pat. No. 3,269,170 discloses a test apparatus for relief valves. The apparatus determines the valve operation pressure prior to the valve "popping" to relief pressure and therefor prevents loss of operating fluid.

U.S. Pat. No. 3,872,875 to Raidl, Jr. discloses use of a frangible diaphragm or rupture disc that normally isolates the safety valve inlet from the operating fluid. A side port for venting and enabling testing of the safety valve is located between the reverse buckling rupture disc and the safety valve. During testing the rupture disc isolates test fluid from the operating fluid. During pressure relief operation, the rupture disc fails by buckling to enable operation of the safety valve.

An "Apparatus For Periodically Testing The Operation Of Safety Valves" is disclosed in Trevisan U.S. Pat. No. 4,428,223. The calibrated spring of the safety valve is tested by applying an external force to operate the valve. From the force values obtained by testing, the opening pressure of the safety valve may be calculated without actually opening the safety valve.

Vanderburg U.S. Pat. No. 4,480,653, is entitled "In-Service Test Valve." The test valve is shiftable automatically in response to a test pressure between an in-service position or condition and a test position that separates in-service and test pressure. The operation of the safety valve disclosed for use with this valve employs a control sensor to supply a back pressure to the dome of the safety relief valve for holding or biasing that valve in the closed position. The test pressure is applied to the control sensor while the dome of the safety valve is isolated from the test pressure.

Each of the above mentioned patents is hereby totally incorporated by reference for forming a portion of this disclosure as if they were fully set forth herein.

SUMMARY OF THE INVENTION

The field of the present invention relates to testing of safety pressure relief valves and more particularly to controlled in-service testing of such valves.

A test housing is connected between the operating fluid pressure containing equipment and the pressure relief valve. The test housing enables substantially unrestricted communication of the operating fluid with the safety valve when in the normal operating condition to provide the desired overpressure protection. When it is desirable or necessary to test the safety valve, a block valve carried by the housing is closed to isolate the operating fluid from the safety valve. Test fluid is then injected between the block valve and the safety valve and the pressure of the test fluid is controlled to determine or verify the pressure at which the safety valve opens. After verification that the proper opening pressure is set on the safety valve, the test pressure is vented and the block valve opened to provide normal pressure protection of the operating fluid by the safety valve. To prevent undesired operation of the test housing block valve, the valve actuator means may be locked in the open position.

An object of the present invention is to provide a new and improved method for testing pressure relief valves.

Another object of the present invention is to provide a new and improved apparatus for testing pressure relief valves.

A further object of the present inventions is to provide a new and improved housing for testing pressure relief valves having a block valve for positively isolating the pressure relief valve and which is lockage to prevent undesired isolation.

BRIEF DESCRIPTION OF THE DRAWINGS

The FIGURE illustrates the Apparatus of the present invention in a typical installation capable of in-service testing of a safety relief valve.

DESCRIPTION OF THE PREFERRED EMBODIMENT

In the FIGURE, a typical installation of the apparatus, generally designated A, of the present invention is illustrated. In the illustrated embodiment, a pipeline P is protected from contained fluid overpressure by a conventional pressure relief safety valve V. Mounted between and connected to the valve V and the pipeline P is a test housing H of the present invention. The housing or tubular member H provides an internal central flow passage or bore B for communicating the operating fluid contained in the pipeline P or bore B to the safety valve V for providing overpressure relief protection to the pipeline P in the normal or usual operating manner. When the potentially damaging overpressure condition occurs in the contained operating fluid of the pipeline P the pressure relief safety valve V opens to vent or discharge operating fluid. When the operating fluid pressure is relieved sufficiently to return to safe operating levels for the pipeline P, the valve V automatically closes to resume normal pipeline operation.

It is to be understood that the arrangement illustrated in FIG. 1 is for the purpose of describing the present invention, and that application of the present invention is not so limited. For example, the present invention may be used on any pressurized flow line. Nor is the present invention limited to flow lines as it may be employed on any equipment containing fluid under pressure such as, but not limited to, boilers, tanks, pressure vessels, etc. The present invention may be employed in any pressurized fluid installation where the use of a pressure relief safety valve V is appropriate, desired or required.

The safety relief valve V may be selected from any of the conventional normally biased closed types which are well known and commercially available from many suppliers. Examples of such valves and their operation are disclosed in the previously mentioned Patents which have previously been incorporated herein by specific reference. Normally the nature and type of operating fluid involved (liquid, vapor, gas, slurry or the like), the normal operating pressure of the equipment, the type of equipment being protected and certain other factors will all influence the actual selection of the safety relief valve V employed.

As illustrated in the FIGURE, the safety valve includes a body 10 having an interior flow passage or chamber 12 connecting an inlet opening 14 and an outlet flow opening 16. Located adjacent and surrounding the opening 14 is a seat ring 18 which is sealed to the body 10 for directing all flow through the central passage 20 of the seat ring 18. A flow closure element formed by ball member 20 sealingly engages the seat 18 when the ball 20 is in the closed position. When the seal of the ball 20 with the seat ring is broken by movement of the ball 20 away from the seat 18, the valve is said to open or "pop". When in the open condition, the valve enables flow from the inlet 14 through the chamber 12 to the outlet 16 for venting or reducing operating fluid pressure in the usual manner.

To control movement of the ball 20, a ball retainer 24 may be employed. If desired, the separate ball 20 and retainer 22 may be combined in a single member sealing with the seat ring 18. A stem 24 is mounted with the retainer and extends upwardly through the center of a spring adjustment bushing 26. The bushing 26 enables and guides reciprocating movement of the stem 24 for enabling opening movement of the ball 20 and ball retainer 22 from the seat ring 18. Concentrically disposed about the stem 24 is a helical spring 28 which engages the ball retainer 22 at one end. The upper end of the spring 28 engages a spring retainer 30 which is thereby held against the adjustment bushing 26. The bushing 26 is secured to the valve body 10 by engaged helical threads 32. By rotating the bushing 26 the helical threads 32 will control the distance between the spring retainer 30 and the ball retainer 22 and thereby the magnitude closing force of the spring 28 on the ball member 20. By selection of an appropriate spring constant (Force produced per unit of spring deformation) the closing force of the pressure relief valve may be carefully controlled. And since the closing force must be overcome by the inlet pressure created opening force, such spring adjustment arrangement also controls the force at which the ball 20 will lift from the seat 18 to open the pressure relief valve V. The opening force is provided by the projected area of sealed ball 20 on which the fluid pressure in the valve inlet 14 urges.

The test housing H is connected between the safety valve V and the source of contained fluid under pressure to be protected from the overpressure condition which in the illustrated embodiment is pipeline P. The housing member H is preferably formed by a tubular assembly 40 having a concentric, constant diameter, central opening for forming the bore B. In the illustrated embodiment, interval or box helical threads 42 are provided in the bore B for connecting or securing the pressure relief valve V with the test housing H. A similar arrangement using helical box threads 44 is illustrated for securing with the pipeline P. It will be understood, however, that other suitable or convenient means for operably securing or connecting the test housing H may be employed in place of either or both threads 42 or 44.

When operably connected, the housing H forms a sealed or contained flow path or passageway with the bore B for communicating the operating fluid in the pipeline with the inlet 14 of the pressure relief valve V.

The tubular assembly 40 includes a first or upper tubular section 46 and a second or lower tubular section 48. The tubular section 46 and 48 are releasably connected by suitable means such as sealing engaged flanges 46a and 48a secured by conventional bolting 50 in the usual manner. Other means may be employed to secure the section 46 and 48 if desired.

The lower section 48 preferably includes one or more bore access threaded side flow ports 50. If desired, a conventional block valve 52 may be employed to shut in the operating fluid and thereby enabling online or in-service change out of the connected pressure gauge G indicating pipeline or operating fluid pressure.

A portion of the bore B adjacent flange 48a formed by the tubular section 48 is enlarged for receiving a movable valve closure means C. Preferably a rotatable ball-type valve closure 60 having upper and lower seat rings 62 and 64, respectively, is employed, but other suitable valves means may be employed. The movable ball 60 is formed with a flow port 60a which when aligned with the bore B places the valve closure means in the open position for enabling communicating through the bore B. When the ball 60 is rotated to the closed position with the flow port 60a disposed perpendicular or transverse to the base B (not illustrated) the ball 60 blocks fluid communication through the bore. To prevent leakage about the ball 60, the upper and lower seats 62 and 64 each sealingly engage both the outer spherical surface of the ball 60 and the lower section 48. This sealing arrangement controls all fluid communication through the bore B with the selected position of the flow port 60. Preferably the ball flow port 60a is of the same size or diameter of the bore B to provide a substantially unrestricted flow path through the bore B and minimize and pressure drop occurring in the test having H when the pressure relief valve V is in the open positions.

Operably connected with the ball 60 for effecting operating rotation between the open and closed positions is a valve actuator means provided by stem or operating shaft 66. The stem 66 is sealingly journaled and secured in an opening 52 formed in the lower section 48 and protrudes externally of the tubular test housing H for enabling desired manipulation of the position of the ball 60. The stem 66 is provided with an outer portion 66a for engagement with a wrench or operating level (not illustrated) for effecting operating rotation of the stem 66 and ball 60 in the usual manner. To move the ball 60 between the open and closed positions, it is only necessary to rotate the stem 66 and ball 60 through an arc of 90 degrees (a quarter turn). This rapid response valve movement is one reason that a ball-type valve is often preferred for this application, but other types of valve closures may be employed if desired.

Exteriorly of the test housing H the stem 66 is provided with a flange 68 which may be used as an external movement limit stop to control ball 60 movement between the open and closed positions. The movable stem flange 68 is also provided with a suitable locking opening 68a for receiving the clasp 70 of a conventional locking device 72. The tubular housing H is also provided with a lock opening 48b positioned to align with the opening 68a on the flange 68 when the ball 60 is in the open position. By inserting the clasp 70 through aligned openings 48b and 68a and then; locking the device 72, movement of the ball 60 from the open position is prevented. Such arrangement provides a locking means for preventing inadvertent or undesired movement of the ball 60 to the closed position and thereby isolating the operating fluid from the pressure relief valve V to create a hazardous condition.

The upper tubular section 46 is also provided with one or more internally threaded side flow ports 76 for communicating the bore B with the exterior of the housing H. Preferably a conventional manually operated block valve 78 is used to control fluid communication through the port or ports 76. During on-line testing of the pressure relief valve V the port 76 is used to communicate test fluid pressure with the inlet 14 of the safety valve V through the bore B.

In the use and operation of the present invention the apparatus A is assembled and installed in the manner illustrated. Normally the pressure relief valve V is calibrated in the shop or during manufacture and does not need an initial verification or test. However, in place testing or verification may be carried out using the method of the present invention before placing the safety system in service.

During normal operations, the ball 60 is locked in the open position for communicating operating fluid in the pipeline P to the inlet 14 of the pressure relief valve V. On occurrence of an over pressure condition in the pipeline the pressure relief valve V will open to vent or relieve the overpressure to protect the pipeline from failure. As the overpressure condition terminates, the pressure relief valve V automatically closes to resume normal pipeline operating conditions.

When it becomes desirable to verify the proper operating or opening pressure of the pressure relief valve, the locking device 72 is unlocked and the clasp 70 removed from the aligned opening 68a and 48b. This unlocking of the valve actuation stem 66 enables the ball 60 to be rotated to the closed position thereby isolating the inlet 14 of the pressure relief valve V from the operating fluid in the pipeline. When the ball 60 is closed, the pressure relief protection provided by the pressure relief valve V is eliminated. However, by continuously monitoring the pressure gauge G the test crew can visually determine that a normal pressure condition exists in the pipeline P. In the event the pipeline P pressure condition begins to increase, testing may be immediately terminated and the pressure relief valve V quickly restored to service by opening ball 60 and closing valve 78.

With the ball 60 closed, the block valve 78 may be opened to enable communication of a source S of test fluid under controlled pressure into the bore B and inlet 14. The test fluid pressure is then increased to determine the fluid pressure at which the ball member 20 will compress spring 28 and lift from seat 18 to enable flow from outlet 16. The opening of the safety valve V may be monitored from the pressure test set S or visually by removing vent line 60 and observing through outlet 16. If necessary, the adjustment bushing 26 may be rotated to adjust the spring force to the proper value or compression. Such testing or verification and spring adjustment can be repeated as often as necessary to achieve the proper operation of the pressure relief valve. If desired, the safety relief valve V may be changed or replaced.

To return the pressure relief valve V to service, the test fluid pressure is vented from the bore B and the block valve 78 closed. The ball valve 60 is then rotated a quarter turn to the open position. The clasp 70 is then inserted through the aligned locking openings 48b and 68a and the device 72 is locked to prevent tampering with the open position of the ball valve 60.

The foregoing disclosure and description of the invention are illustrative and explanatory thereof, and various changes in the size, shape and materials, as well as in the detailed of the illustrated construction, may be made without departing from the spirit of the invention.

What is claimed is:

1. Apparatus adapted for testing of a pressure safety valve while enabling the pressure safety valve to remain operational, including;
    a housing having an internal flow passage formed therethrough;
    means for connecting said housing with a contained source of operating fluid under pressure to communicate said operating fluid into said internal flow passage;
    means for connecting said housing with the pressure safety valve to communicate the operating fluid to the inlet of the pressure safety valve;
    valve means mounted with said housing for controlling communication through said flow passage, said valve means movable between an open position providing substantially unrestricted communication through said flow passage and a closed position for substantially blocking communication through said flow passage;
    actuator means mounted with said housing for manually moving said valve means to and from the open and closed position from exteriorly of said housing;
    said actuator means having means for enabling locking of said actuator means with said housing to prevent undesired movement of said valve means from the open position.

2. The apparatus as set forth in claim 1, wherein:
    said valve means includes a rotatable ball-type valve having a straight through flow port formed therethrough, said ball-type valve rotatable by said actuator means to dispose said ball-type valve in the closed position with said flow part transverse to said flow passage and to dispose said ball-type valve in the open position with said flow part aligned with said flow passage.

3. The apparatus as set forth in claim 2, wherein:
    said flow part forming a substantially unrestricted flow path through said flow passage when in the open position.

4. The apparatus as set forth in claim 1, including
    a side port formed in said housing between said means for connecting said housing with a pressure safety valve and said valve means, said port communicating said flow passage and the exterior of said housing; and
    means for selectively controlling communication through said side port.

5. The apparatus as set forth in claim 4, wherein:
    said means for enabling locking of said actuator means includes a first opening on said housing and a second opening in said actuator, said second opening located adjacent to and aligned with said first opening when said valve means is in the closed position to enable placement of a locking member through said first and said second opening for locking said valve means in the open position.

* * * * *